US012300202B2

(12) United States Patent
Bolzmacher et al.

(10) Patent No.: US 12,300,202 B2
(45) Date of Patent: May 13, 2025

(54) # ASSEMBLY FOR TRANSMITTING AIRBORNE ACOUSTIC WAVES, WHICH CAN BE COMBINED WITH A MUSICAL WIND INSTRUMENT HAVING SIDE HOLES

(71) Applicant: COMMISSARIAT A L'ENERGIE ATOMIQUE ET AUX ENERGIES ALTERNATIVES, Paris (FR)

(72) Inventors: Christian Bolzmacher, Gif-sur-Yvette (FR); Alexis Geray, Gif-sur-Yvette (FR); Sylvie Lamy, Gif-sur-Yvette (FR); Pierre-Henri Orefice, Gif-sur-Yvette (FR); Kevin Saint-Alme, Gif-sur-Yvette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/708,170

(22) PCT Filed: Nov. 21, 2022

(86) PCT No.: PCT/EP2022/082654
§ 371 (c)(1),
(2) Date: May 7, 2024

(87) PCT Pub. No.: WO2023/099266
PCT Pub. Date: Jun. 8, 2023

(65) Prior Publication Data

US 2024/0420667 A1 Dec. 19, 2024

(30) Foreign Application Priority Data

Dec. 3, 2021 (FR) ...................................... 2112923

(51) Int. Cl.
*G10H 1/00* (2006.01)
*G10D 9/00* (2020.01)
(Continued)

(52) U.S. Cl.
CPC ............. *G10H 1/0008* (2013.01); *G10D 9/00* (2013.01); *G10H 1/14* (2013.01); *G10H 3/125* (2013.01);
(Continued)

(58) Field of Classification Search
CPC ........ G10H 1/0008; G10H 1/14; G10H 3/125; G10H 2220/351; G10H 2220/461; G10D 9/00
(Continued)

(56) References Cited

U.S. PATENT DOCUMENTS 2,489,653 A * 11/1949 Leslie .................... G10H 1/047 381/62
3,482,026 A * 12/1969 Babicky ................... G10H 3/00 84/723
(Continued)

FOREIGN PATENT DOCUMENTS

EP 0423858 A2 * 4/1991
EP 3564947 B1 * 10/2021 ............... G10H 1/02
(Continued)

*Primary Examiner* — Christina M Schreiber
(74) *Attorney, Agent, or Firm* — BakerHostetler

(57) ABSTRACT

An assembly for transmitting airborne acoustic waves, configured to be combined with a musical wind instrument having side holes, which instrument comprises a tubular body defining an air column and extending locally substantially along a first axis, the transmission assembly comprising: a device for emission of airborne acoustic waves in the air column, comprising an actuator which is separate from the tubular body and able to transform an electrical signal into airborne acoustic waves; a device for reception of
(Continued)

airborne acoustic waves, comprising: a microphone suitable for receiving, after their propagation in the air column, the waves transformed by the actuator, the microphone being positioned off-centre with respect to the first axis; a transformation device suitable for transforming the waves received by the microphone into an electrical signal that is characteristic of a configuration of blocking of the side holes of the instrument.

12 Claims, 4 Drawing Sheets

(51) Int. Cl.
*G10H 1/14* (2006.01)
*G10H 3/12* (2006.01)

(52) U.S. Cl.
CPC . *G10H 2220/351* (2013.01); *G10H 2220/461* (2013.01)

(58) Field of Classification Search
USPC ............................................................ 84/609
See application file for complete search history.

(56) References Cited

U.S. PATENT DOCUMENTS

| | | | | | |
|---|---|---|---|---|---|
| 3,555,956 | A * | 1/1971 | Martin | G10D 9/06 | 84/400 |
| 4,119,007 | A * | 10/1978 | Criglar | G10H 3/143 | 84/730 |
| 5,149,904 | A * | 9/1992 | Kamiya | G10H 1/02 | 84/723 |
| 5,770,893 | A * | 6/1998 | Youlton | F03B 13/24 | 60/497 |
| 6,737,572 | B1 * | 5/2004 | Jameson | G10H 3/125 | 84/743 |
| 9,418,636 | B1 * | 8/2016 | Malluck | G10H 3/22 | |
| 10,021,490 | B2 * | 7/2018 | Akino | H04R 31/006 | |
| 2005/0076774 | A1 * | 4/2005 | Sakurada | G10H 5/005 | 84/616 |
| 2007/0221038 | A1 * | 9/2007 | Sawada | G10D 7/10 | 84/380 R |
| 2007/0234887 | A1 * | 10/2007 | Sawada | G10D 9/04 | 84/723 |
| 2009/0020000 | A1 * | 1/2009 | Onozawa | G10D 7/00 | 84/723 |
| 2009/0038463 | A1 * | 2/2009 | Fujii | G10D 9/03 | 84/398 |
| 2012/0308043 | A1 * | 12/2012 | Hochleitner | G10K 11/20 | 381/98 |
| 2018/0137848 | A1 * | 5/2018 | Souvestre | G10H 3/22 | |
| 2019/0012997 | A1 * | 1/2019 | Katz | G10H 1/40 | |
| 2020/0043454 | A1 * | 2/2020 | Smith | G10H 3/26 | |
| 2022/0366883 | A1 * | 11/2022 | Smith | G10H 3/125 | |
| 2024/0420667 | A1 * | 12/2024 | Bolzmacher | G10H 1/14 | |

FOREIGN PATENT DOCUMENTS

| | | | | | |
|---|---|---|---|---|---|
| FR | 3103951 | A1 | * | 6/2021 | G10H 1/32 |
| GB | 2537104 | A | * | 10/2016 | G10D 7/00 |
| JP | 2005122099 | A | * | 5/2005 | |
| WO | WO-2016173879 | A1 | * | 11/2016 | G10H 3/143 |
| WO | WO-2017013455 | A1 | * | 1/2017 | G10H 1/02 |
| WO | WO-2023099266 | A1 | * | 6/2023 | G10D 9/00 |

* cited by examiner

ASSEMBLY FOR TRANSMITTING AIRBORNE ACOUSTIC WAVES, WHICH CAN BE COMBINED WITH A MUSICAL WIND INSTRUMENT HAVING SIDE HOLES

CROSS-REFERENCE TO RELATED APPLICATIONS

This application is a National Stage of International patent application PCT/EP2022/082654, filed on Nov. 21, 2022, which claims priority to foreign French patent application No. FR 2112923, filed on Dec. 3, 2021, the disclosures of which are incorporated by reference in their entireties.

FIELD OF THE INVENTION

The invention falls within the technical field of hybrid musical wind instruments, that is to say wind instruments which can alternately operate according to a first, acoustic mode and according to a second, digital mode. The invention applies to all types of musical wind instruments with side holes, including a clarinet, a saxophone, a flute, an oboe, a cor anglais or a bassoon, this list not being exhaustive. It relates to an assembly for transmitting airborne acoustic waves that can be combined with a musical instrument as mentioned above.

BACKGROUND

The acoustic mode of operation is the native mode of operation of a musical wind instrument. In this mode, the sound is produced by vibrations of the air column of the instrument which are triggered by the blowing of the player.

A digital mode of operation consists in equipping a musical wind instrument with electronic components which allow the production of digital sounds obtained by a sound synthesis technique applied to one or more electrical signals produced by the components.

The digital mode of operation of a musical wind instrument notably makes it possible to render the instrument silent by rendering the digitized sound to the player through a headset. Indeed, acoustic musical practicing can be a source of sound nuisance and can force a musician to play only during certain time bands, even discourage him or her from practicing this instrument.

Another advantage of a digital mode of operation is the widening of the range of tones using a sound synthesis technique.

One problem to be resolved in this context is how to design a device which can be combined with the acoustic wind instrument that can easily be reversible for the user to be able to switch from a digital mode of operation to an acoustic mode of operation.

Another problem to be resolved is how to design a device that can be adapted to the same instrument from different manufacturers, that is to say which is adaptable regardless of the geometrical deviations from one manufacturer to another without in any way modifying the dimensions of the instrument.

A first approach to render an instrument silent consists in attenuating the sound produced by the instrument. For that, methods are known that are based on the use of absorbent materials of foam type or methods based on an attenuation by enveloping. These methods are unintrusive and cost little but are not sufficiently effective over the entire acoustic spectrum considered. Generally, the sound produced by the wind instruments with side holes is more difficult to attenuate than the sound produced by other instruments, for example instruments from the brass family.

Another approach for limiting the sound nuisances consists in using a device that replaces the acoustic operation of the instrument, in other words a totally digital instrument. This type of instrument makes it possible simultaneously to measure the blowing parameters (intensity and pinching of the lips) and the position of the fingers on the instrument. The keys can be static or mechanical. When coupled to a synthesizer, this type of instrument makes it possible to have a wide range of tones and proves easy to use. Its minimalist technical design makes it a product that is relatively affordable in terms of costs. On the other hand, the way such a device is held is different from a clarinet or a saxophone because of the configuration and the mechanical behavior of the keys and of the mouthpiece. This instrument therefore requires additional and non-shared learning which is unsatisfactory when the musician wants to increase competence with his or her acoustic instrument.

One solution from the prior art consists in inserting a device which is interposed between two high parts of an instrument, for example between the mouthpiece and the crook of a saxophone, to allow the waves to be detected. This solution is unsatisfactory because it elongates the size of the musical instrument and therefore modifies the posture of its user (notably a retraction of the head with respect to the position of the arms). Moreover, the response times stated for this type of solution are more than 100 ms. A response time of this order of magnitude is unsatisfactory for the practicing of a wind instrument, it needs to be much shorter, and ideally less than 10 ms.

Another solution from the prior art measures the standing wave which is created in the air column following the vibration thereof by an actuator placed in the high part of the instrument. The time that is necessary to excite this standing wave is of the order of several tens of milliseconds. That is not satisfactory for the practicing of a wind instrument. Ideally, the response time lies around 10 ms.

Another solution uses the ultrasound elastic mechanical waves that are propagated in the body of the instrument to detect the position of the keys. In this configuration, an emitter is placed in the high part in contact with the body of the instrument and a receiver is placed in the low part. This configuration allows for a rapid and fluid detection of the notes. However, this solution is sensitive to the physical contact exerted on the instrument and is reflected by low detection robustness.

Finally, one last known solution uses electromagnetic waves of several megahertz by using the tubular structure as waveguide (emitter at the top and receiver at the bottom). This solution is also sensitive to the contacts, to the position of the emitter and of the receiver and to external disturbances (electromagnetic waves). The waveguide necessitates a material with a low resistivity to keep a good integrity of the signal. The non-conductive materials limit the wave propagation distance. This solution is therefore unsatisfactory.

SUMMARY OF THE INVENTION

The invention aims to mitigate all or part of the problems cited above by proposing an assembly that is adaptable, removable and universal for different instruments capable of generating and receiving airborne acoustic waves in the air column of the instrument, and that exhibits a response time of a few milliseconds to allow a rapid and fluid detection of the notes, compatible with the practicing of a wind instrument. Furthermore, the assembly that is the subject of the invention is insensitive to the physical contacts or external disturbances exerted on the instrument (contact on the instrument, variations of ambient temperature). The result thereof is an assembly that is adaptable, removable and universal and that exhibits a strong note detection robustness regardless of the external disturbances to which the instrument is subjected.

To this end, the subject of the invention is an airborne acoustic wave transmission assembly configured to be combined with a musical wind instrument with side holes comprising a tubular body defining an air column, the tubular body extending locally substantially along a first axis, said transmission assembly being intended to be disposed removably inside the tubular body of the instrument, the transmission assembly being characterized in that it comprises:

- a device for emitting airborne acoustic waves in the air column comprising:
  - a first structure for fixing to the tubular body of the instrument;
  - an actuator capable of transforming an electrical signal into airborne acoustic waves;
  - an intermediate element for fixing the actuator to the first fixing structure configured to separate the actuator from the tubular body;
- an airborne acoustic wave reception device comprising:
  - a second structure for fixing to the tubular body of the instrument;
  - a microphone linked to the second fixing structure, the microphone being capable of receiving, after the propagation thereof in the air column, the airborne acoustic waves emitted by the actuator, the microphone being positioned preferentially off-center with respect to the first axis;
  - a transformation device linked to the second fixing structure and capable of transforming the airborne acoustic waves received by the microphone into an electrical signal characteristic of a configuration of plugging of the side holes of the instrument.
- the tubular body comprising a stop, the first fixing structure comprises a guideway, the guideway being intended to guide the emission device along the tubular body to the stop.

Advantageously, the intermediate element for fixing the actuator to the first fixing structure is an insulating membrane so as to prevent a transfer of acoustic mechanical waves from the actuator to the tubular body, the intermediate element being preferentially made of foam, rubber or plastic.

Advantageously, the reception device comprises a device for positioning the second fixing structure with respect to the tubular body.

Advantageously, the device for positioning the second fixing structure comprises at least three spot contacts between the second fixing structure and the tubular body configured to block the reception device in rotation about the first axis.

Advantageously, the actuator is a piezoelectric actuator, a piezoelectric pad, a loudspeaker or an electrodynamic exciter.

Advantageously, the microphone is a wideband microphone.

Advantageously, the transmission assembly according to the invention further comprises a device for detecting a position of a key of the instrument linked to the transformation device, preferentially at least two magnetometers and one magnetic field emitter.

Advantageously, the airborne acoustic wave reception device further comprises a loudspeaker linked to the transformation device, said loudspeaker being configured to render the electrical signal characteristic of a configuration of plugging of the side holes of the instrument as an audible note.

Advantageously, the airborne acoustic wave reception device further comprises a temperature sensor linked to the transformation device to supply the transformation device with temperature information, the transformation device being configured to take account of the temperature when transforming the airborne acoustic waves received by the microphone into an electrical signal.

The invention relates also to a musical wind instrument with side holes intended to selectively produce acoustic sounds and electrical sounds, comprising such a transmission assembly.

In one embodiment of the invention, the instrument is a saxophone or a clarinet or a flute or an oboe or a bassoon.

BRIEF DESCRIPTION OF THE DRAWINGS

The invention will be better understood and other advantages will become apparent on reading the detailed description of an embodiment given by way of example, the description being illustrated by the attached drawing in which.

DETAILED DESCRIPTION

The invention is intended to be implemented for an application of a method making it possible to detect and locate a disturbance of a medium through a system composed of at least one acoustic wave emitter and of at least one acoustic wave receiver coupled to an electronic device which receives and analyses the signal produced by the acoustic wave receiver to deduce therefrom the location of the disturbance. Such a method is known from the prior art, for example the international publication WO2016/173879.

Hereinafter in the description, the expression airborne acoustic waves will be used to more broadly denote the compatible waves of the application considered of which the ultrasound waves form part. The frequency range of the waves is preferentially situated between 20 and 40 kHz, or between 20 and 60 kHz or between 20 and 80 kHz or more.

Furthermore, the invention is described using the example of a saxophone but the invention applies to all types of musical wind instruments with side holes including a clarinet, a saxophone, a flute, an oboe, a cor anglais or a bassoon, this list not being exhaustive.

More generally, the invention is described in the field of musical wind instruments. However, the principle of the invention can be applied to any device that is adaptable, removable for positioning in a hollow body, as for example in a channeling with variable or non-variable geometry, notably for non-destructive inspection applications with detection of acoustic activity.

The present invention relates to an airborne acoustic wave transmission assembly configured to be combined with a musical wind instrument with side holes that is intended to be disposed removably inside the tubular body of the instrument. The inside of the tubular body of the instrument forms an air column. The invention makes it possible to identify the notes played with the instrument from the acoustic signature generated in the air column via the opening or the closing of the valves of the instrument. The principle of the invention relies on the excitation of the air column via an actuator, for example piezoelectric, in the ultrasound spectrum at the crook and the acoustic signature is measured at the bell via a microphone, for example a wideband microphone. This arrangement makes it possible to detect the note played in only a few milliseconds by being robust to environmental disturbances such as a physical contact on the instrument or an ambient noise. The recognition of the notes is performed via a dedicated algorithm (by correlation or classification). The transmission assembly comprises a wave emission device and a wave reception device, as explained by means of the figures described hereinbelow.

Figure 1:
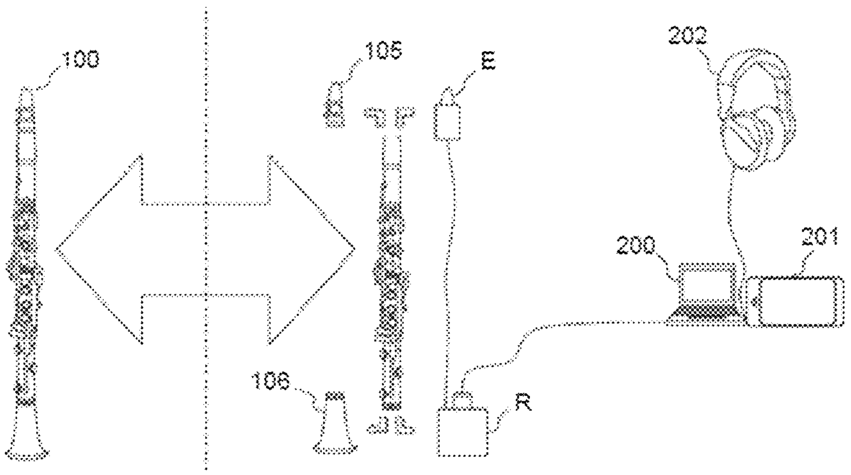
FIG. 1 schematically illustrates an example of possible application of the principle of the invention.

FIG. 1 schematically illustrates an example of possible application of the principle of the invention.

The left-hand part of FIG. 1 shows a clarinet 100 in a configuration for acoustic playing, that is to say an original clarinet. The right-hand part of FIG. 1 identifies two removable parts of the instrument: the mouthpiece 105 and the bell 106. These two parts can be removed to configure the instrument in digital mode. For that, the original mouthpiece 105 is removed and an emission device according to the invention can be placed in the crook or barrel of the instrument (or directly on the instrument instead of the crook or removable barrel). Similarly, in the original bell 106, a reception device according to the invention can be positioned. The transmission assembly comprises (preferentially at the reception device), linked to the outside of the instrument, a transformation device, corresponding for example to a computing or electronic device capable of receiving and analyzing the signal produced by an acoustic wave receiver to deduce therefrom the location of the disturbance, linked to the emitters and receivers to implement a method for detecting and identifying the state of plugging of the holes of the instrument. The transformation device is designed to implement the actions detailed hereinbelow. It comprises a processing unit for executing instructions of a computer program to implement these actions. However, it could be replaced by an electronic device composed only of electronic circuits (without computer programming) for performing the same actions. Generally, a method for detecting and identifying the state of plugging of the side holes of a musical wind instrument comprises an initial learning phase in which one state of plugging of the holes of the instrument out of all of the possible states is activated, airborne acoustic waves are made to propagate in the instrument from the emission device situated on the instrument (preferentially at the mouthpiece or the crook/barrel), the airborne acoustic waves are picked up by the reception device of the transmission assembly of the invention and certain characteristics of the signal picked up are saved in a library, this first phase being iterated over all of the states of plugging of the holes of the instrument corresponding to its chromatic tablature, and a second detection phase in which the player activates a state of plugging of the holes of the instrument to produce a corresponding note, the airborne acoustic waves transmitted by the emission device and to the reception device are picked up again and certain characteristics of the signal picked up are compared to the corresponding characteristics in the library to deduce therefrom the state of plugging of the holes which is activated and then deduce therefrom the corresponding note. The person skilled in the art will be able to refer to different documents of the prior art to implement one or more of the variants of the method for processing the signal produced by one or more receivers of elastic mechanical waves.

The mouthpiece can also be a modified mouthpiece which can be linked to the computing device incorporated in the bell and comprise a device for detecting the blowing of the player. In this way, it is possible to synchronize the digital rendering of the notes with the blowing of the player.

The computing device supplies a computer with the notes associated with the states of plugging of the holes which have been detected. The computer executes a sound synthesis method to digitally render the notes to a user by means of a headset 202. The computer can be embedded in a computer 200 or a smart phone 201 or any other equivalent electronic device.

Details relating to the detection and the identification of the configuration of plugging of the side holes of the instrument are available in the prior art, for example the international publication WO2016/173879. The present invention relates to the emitter and receiver device that can be used in the context of such a detection.

Figure 2:
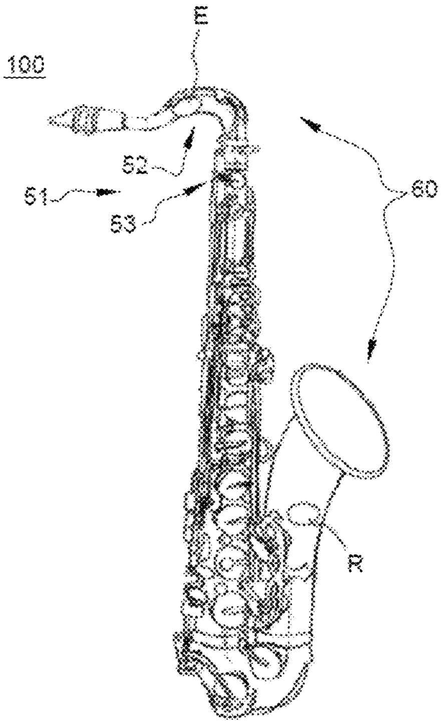
FIG. 2 schematically represents an example of possible positioning of a transmission assembly according to the invention in an instrument.

FIG. 2 schematically represents an example of possible positioning of a transmission assembly 60 according to the invention. The airborne acoustic wave transmission assembly 60 is configured to be combined with a musical wind instrument 100 with side holes comprising a tubular body 101 defining an air column 103. The tubular body 101 extends locally substantially along a first axis X, and said transmission assembly is intended to be disposed removably inside the tubular body 101 of the instrument 100. The transmission assembly 60 comprises a wave emission device E and a wave reception device R. The emission device E, called emitter, is positioned preferentially in the crook of the instrument 100 and the reception device R, called receiver, is positioned preferentially in the bell of the instrument 100. The invention therefore relies on a transmission of an acoustic signal via the air column, a transmission of the data between receiver and computer (reception device R), and a transmission of data between the computer (reception device R) and the emitter (emission device E).

As will be detailed hereinbelow, the positioning of the transmission assembly in the body of the instrument makes it possible to conserve the initial geometry of the instrument. In addition, such a transmission assembly does not generate any hindrance in the handling of the instrument since it is positioned in the body of the instrument.

The emission device E, called emitter, and the reception device R, called receiver, with communication devices between them, communication which can be wired but preferentially is wireless, constitute a transmission assembly 60.

Figure 3:
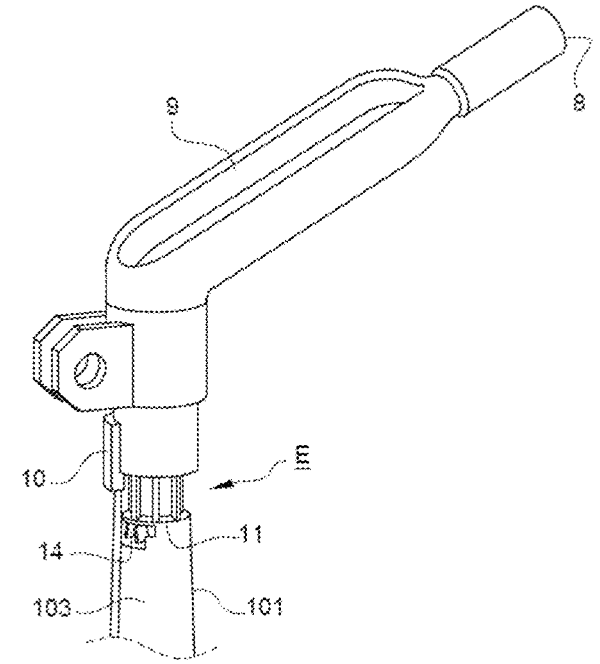
FIG. 3 schematically represents an emission device of the airborne acoustic wave transmission assembly according to the invention positioned at the mouthpiece of the instrument.

FIG. 3 schematically represents an emission device E of the airborne acoustic wave transmission assembly 60 according to the invention positioned at the mouthpiece of the instrument. The airborne acoustic wave emission device E in the air column 103 comprises:

- a first structure 10 for fixing to the tubular body of the instrument;
- an actuator 11 capable of transforming an electrical signal into airborne acoustic waves;
- an intermediate element 12 for fixing the actuator 11 to the first fixing structure 10 configured to separate the actuator 11 from the tubular body.

The actuator 11 is any type of actuator capable of generating airborne acoustic waves. As an example, the actuator can be a piezoelectric actuator, a piezoelectric pad, a loudspeaker, or an electrodynamic exciter.

The intermediate element 12 for fixing the actuator 11 to the first fixing structure 10 is an insulating membrane so as to prevent a transfer of acoustic mechanical waves from the actuator 11 to the tubular body 101, the intermediate element 12 being preferentially made of foam, rubber or plastic.

A player blows into the conventional connector of the mouthpiece 8 via an instrumented mouthpiece. It can be noted that the player can also be in continuous mode without blowing into the instrument. The set 9 of sensors and electronic elements for detecting the blowing re-transcribes the blowing into an electrical signal. This electrical signal powers the actuator 11 which then generates airborne acoustic waves. Alternatively, in order not to lose time in the recognition of the notes, the acoustic signals are preferentially generated continuously, and it is the sound synthesis which is activated by the blowing of the player. These waves are then displaced only in the air column 103. In other words, no wave circulates via the tubular body 101. The intermediate element 12 acts as insulator. While serving as means for attaching the actuator on the first structure 10, it makes it possible to separate the actuator from the tubular body 101. The actuator 11 is therefore isolated from the tubular body. The movements of the actuator 11 aiming to generate waves are not carried forward to the tubular body by virtue of the wave-absorbing action of the intermediate element 12. The actuator 11 can have the form of cymbals which makes it possible to increase the amplitude of the signal emitted.

Figure 4:
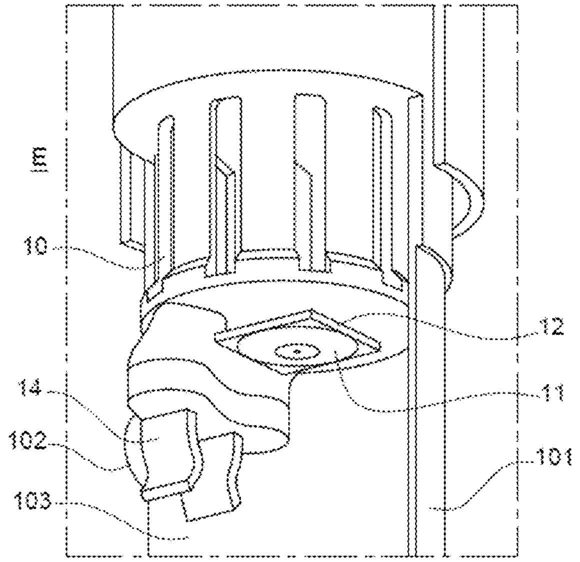
FIG. 4 schematically represents an emission device according to the invention.

FIG. 4 schematically represents an emission device E according to the invention. In this figure, a possible positioning of the elements of the emission device E can be seen in detail. The first structure 10 is positioned in the high part of the tubular body of the instrument. On this first structure 10, the actuator 11 is oriented toward the air column 103. The actuator 11 is linked to the first structure 10 by the intermediate fixing element 12. The intermediate element 12 completely isolates the actuator from the first structure 10 and from the tubular body 101.

The tubular body 101 comprises a stop 102. The first fixing structure 10 comprises a guideway 14, the guideway 14 being intended to guide the emission device E along the tubular body 101 to the stop 102. By virtue of the guideway 14, the emission device E is blocked in translation and in rotation in the body of the instrument. Thus, the first structure 10 is positioned in the crook of the instrument, fixedly and always identically for a same instrument.

Figure 5:
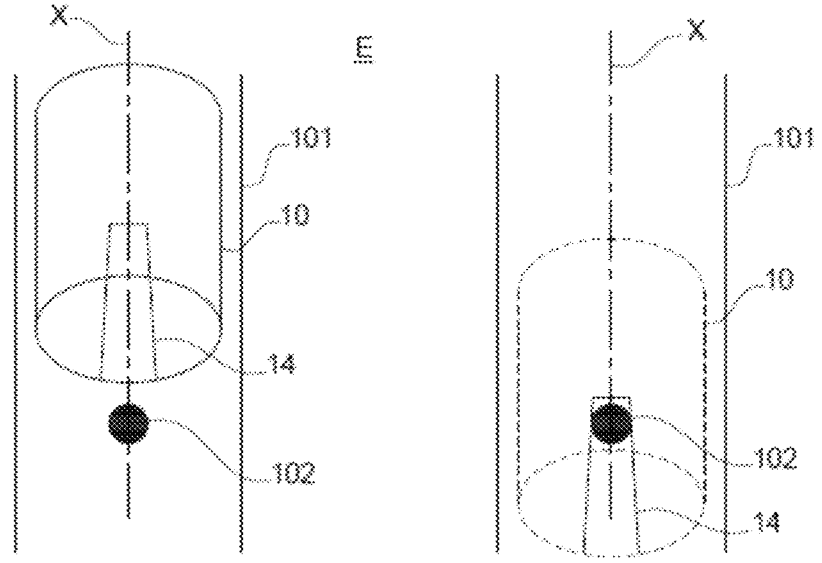
FIG. 5 schematically represents the abutting, in the tubular body, of the first fixing structure of an emission device according to the invention.

FIG. 5 schematically represents the abutting, in the tubular body 101, of the first fixing structure 10 of an emission device E according to the invention. The tubular body 101 of a saxophone comprises a stop 102. This stop is present in all saxophones. The guideway 14 is intended to guide the emission device along the tubular body 101 to the stop 102. In other words, the emission device is first of all positioned in the high part of the tubular body 101 (represented by a solid line in the left-hand part of the figure), then slides in the tubular body 101 until the entry of the guideway 14 encounters the stop 102. The guideway 14 and the stop 102 cooperate, which ensures the angular positioning of the emission device E in the tubular body 101. The guideway 14 also acts as guidance for the emission device E in the tubular body 101 until it abuts against the stop 102. The emission device E is then in its final fixed position for use (represented in the right-hand part of the figure by dotted lines).

Figure 6:
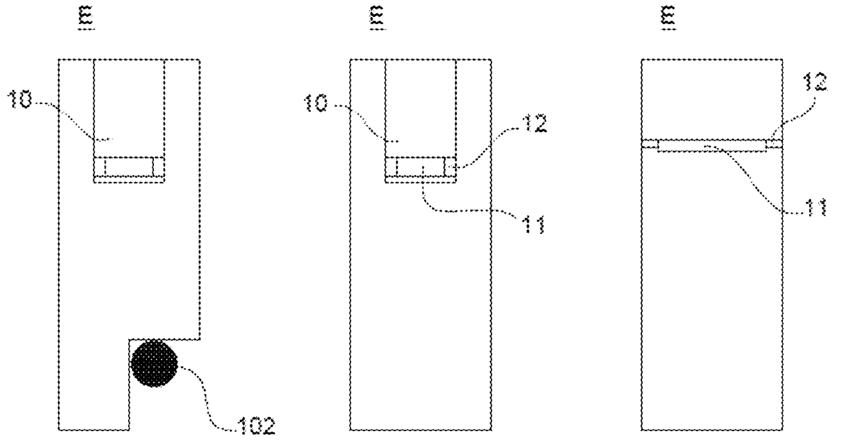
FIG. 6 schematically represents embodiments of the fixing of the actuator onto the first fixing structure of an emission device according to the invention.

FIG. 6 schematically represents embodiments of the fixing of the actuator 11 on the first fixing structure 10 of an emission device E according to the invention. The central representation shows that the actuator 11 can be positioned within the intermediate element 12 which then takes the form of a ring, in a hollow portion of the first structure. The left-hand representation shows the same configuration and reveals the abutting discussed previously for correctly positioning the emission device with respect to the instrument. The right-hand representation shows the possibility of considering an intermediate element 12 in contact with the tubular body. This configuration is made possible by the fact that the intermediate element has a strong insulating role and blocks the transmission of waves from the actuator 11 to the tubular body. It is important to recall that the invention relies on the transmission of airborne acoustic waves via the air column in the tubular body of the instrument, and no elastic mechanical wave should be transmitted via the tubular body of the instrument.

Figure 7:
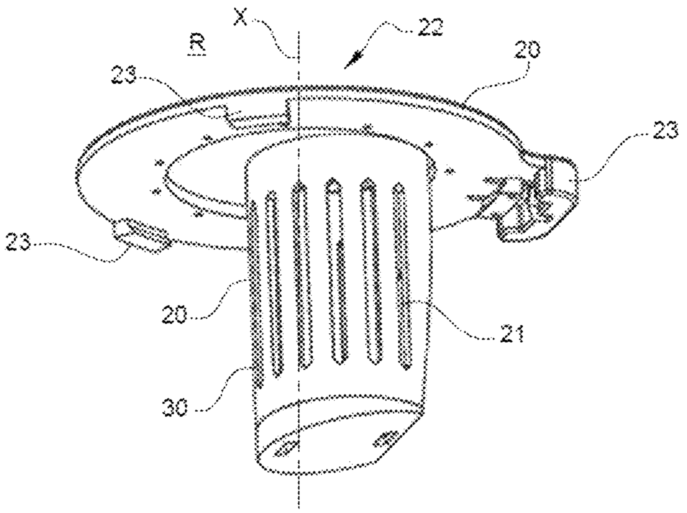
FIG. 7 schematically represents a reception device of the airborne acoustic wave transmission assembly according to the invention positioned at the bell of the instrument.

FIG. 7 schematically represents a reception device R of the airborne acoustic wave transmission assembly 60 according to the invention positioned at the bell of the instrument. It is considered here that the tubular body 101 extends locally, at the bell, substantially along a first axis X, as represented in FIG. 7. The airborne acoustic wave reception device R comprises:

- a second structure 20 for fixing to the tubular body of the instrument;
- a microphone 21 linked to the second fixing structure 20, the microphone 21 being capable of receiving, after the propagation thereof in the air column, the airborne acoustic waves emitted by the actuator 11, the microphone 21 being positioned preferentially off-center with respect to the first axis X; (in a variant, the microphone can be positioned centrally with respect to the first axis X)
- a transformation device 30 linked to the second fixing structure 20 and capable of transforming the airborne acoustic waves received by the microphone 21 into an electrical signal characteristic of a configuration of plugging of the side holes of the instrument.

The microphone 21 is preferentially, but not mandatorily, a wideband microphone.

The reception device R advantageously comprises a device 22 for positioning the second fixing structure 20 with respect to the tubular body 101. Thus, the reception device R is blocked in translation and in rotation in the bell. The second structure 20 is positioned in the bell of the instrument, fixedly and always identically for a same instrument.

In one embodiment, the positioning device 22 of the second fixing structure 20 comprises at least three spot contacts 23 between the second fixing structure 20 and the tubular body 101 configured to block the reception device R in rotation about the first axis X. One of the spot contacts can comprise a screw which, once turned, is fixed onto a part of the tubular body. Alternatively, a central screw system can, upon a rotation, make thin plates deploy from the second structure towards the tubular body to constitute spot contacts in order to block the degrees of freedom of the reception device R.

The reception device R of the invention therefore comprises a rigid element (second structure 20) fixed to the bell of the instrument with adaptation elements for different sizes of instruments as explained previously. The reception device R comprises a sensor of wideband microphone type capable of measuring the ultrasound waves and placed preferentially off-center from the first axis X in order to break the symmetry of the acoustic waves and increase the richness of the acoustic signature specific to each note and therefore to each position of the valves. The offsetting of the microphone 21 with respect to the first axis X makes it possible to avoid destructive wave interferences. By virtue of this configuration, a good detection of the waves is guaranteed.

The control electronics and the batteries can be placed inside a hollow cylindrical body associated with the second structure. Optionally, a reference rod can be placed on the second structure 20 fixed to the bell in order to indicate the correct angular placement of the reception device R with respect to the instrument. This rod then touches the instrument at a position chosen by the user and serves as placement guide. This rod can be retractable.

The transformation device 30 is for example positioned in the hollow body of the second structure 20. It is linked to the microphone to process the airborne acoustic waves received by the microphone after the propagation thereof in the air column, in order to be processed to generate an electrical signal characteristic of a configuration of plugging of the side holes of the instrument. A computing device can be connected to the transmission assembly (emission or reception). The computing device is then capable of supplying a control signal to the emitter transmission assembly which then emits waves and the receiving transmission device receives these waves that its microphone transmits to its transformation device for transformation into a reception signal from the waves received. As a variant, the computing device forms part of the transformation device. Thus, the transformation device is designed to detect and recognize the acoustic signature of the state of plugging from the reception signal corresponding to the acoustic waves received, that is to say to the acoustic waves emitted by the emitter device E and which are propagated in the air column of the instrument. The detection method to be implemented therefore necessitates correctly positioning the transmission assembly in the tubular body 101.

More specifically, the transformation device 30 is configured to: execute a first, learning phase consisting in varying the configurations of the state of plugging of the side holes of the instrument from among all the possible configurations and recording, for each configuration, at least one reference characteristic of the reception signal, executing a second, monitoring (or use) phase while a user plays said musical instrument, consisting in recording, for each note played by the user, at least one current characteristic of the reception signal equivalent to said reference characteristic, and comparing the current characteristic to all of the reference characteristics recorded in order to deduce therefrom the configuration of plugging of the holes of the instrument actuated by the player.

The transmission assembly 60 according to the invention relies on the transmission of airborne acoustic waves via the air column in the tubular body while ensuring a response time that is compatible with the practicing of the musical instrument.

The invention relies on the fact of using an emitter device in the high part of the instrument and a receiver device in the low part of the instrument. It should be noted that the invention is also applicable by reversing the emitter device and the receiver device, that is to say with the emitter device in the low part and the receiver device in the high part of the instrument. A frequency scan covering the ultrasound spectrum between 20 KHz and 80 kHz generates waves via a piezoelectric actuator or an electrodynamic actuator. These waves are displaced in the air column of the instrument. The position of the valves modifies the propagation of these waves and generates a specific signature for each note played. This ultrasound acoustic signature is measured in the low part of the instrument with a receiver device such as a microphone. A classification algorithm is used to recognize the note played and create, via a sound synthesis, an artificial equivalent note. The classification is done using a reference established during a calibration or learning phase at the start of the use of the hybrid instrument.

The invention differs from the solutions of the prior art which go through the body of the instrument, and for which two effects can hamper the correct classification of the notes. First of all, a physical contact (arm, leg, fixing strap, headset cable, et cetera) on the outside of the instrument can be considered as a disturbance and therefore likened to a closed valve. The recognized note is not therefore exact. A second disturbing factor in the solutions of the prior art using the body for the propagation of the waves is a variation of temperature between the learning phase and the classification phase. A higher or lower temperature shifts the position of the resonances of the structure and therefore modifies the acoustic signature. A classification then becomes impossible.

In the invention, by using the air column as means for propagation of ultrasound waves, the transmission assembly is insensitive to audible noises and physical contacts. The influence of temperature is a priori lesser than in the case of the elastic mechanical waves. The pairing of emitter in the high part and receiver in the low part of the instrument makes it possible to keep a good responsiveness of the detection of the keys/notes because the wave propagation time is only a few milliseconds (2.5 ms for an alto saxophone). In order to prioritize the airborne waves, the actuator is decoupled from the body of the instrument (there is therefore no coupling of the actuator with the body of the instrument). The sensor which measures the airborne waves is placed preferably outside of the central axis of the tubular body of the instrument. That breaks the symmetry of the acoustic waves and renders the acoustic signature more rich. That makes it more possible to distinguish the different notes.

Advantageously (and as is visible in FIG. 2), in one possible embodiment, the emission device E can comprise a device 51 for detecting a position of a key of the instrument 100 linked to the transformation device 30, preferentially at least two magnetometers 52 and one magnetic field emitter 53, for example a magnet. This device is schematically represented in FIG. 2. In order to detect the position of the octave key, a magnetic field emitter 53 can be snap-fitted in proximity to the octave key. At least two magnetometers 52, advantageously three, are positioned inside the deformable structure 10 of the emission device E according to different angles. Indeed, from these different positions, it is possible to detect the octave key, regardless of the saxophone used. The transformation device 30 is configured to read the value of the magnetometers and record for each the maximum range of variation of the signal. The latter contains the extreme values due to the displacement of the octave key, but also to the noise. The magnetometer which has the greatest variation is selected. Next, a hysteresis threshold is chosen at a certain percentage of this signal range. Thus, depending on whether the measurement is above or below the chosen threshold, the octave key is read as activated or not.

The transmission assembly according to the invention can be adapted to different instruments which have different and varied bell forms.

In another embodiment, the airborne acoustic wave reception device R can further comprise a loudspeaker (for example disposed on the second structure, outside of the instrument) linked to the transformation device 30, said loudspeaker being configured to render the electrical signal characteristic of a configuration of plugging of the side holes of the instrument as an audible note.

The transmission assembly according to the invention allows for the transmission via the air column of the signal generated by the actuator (at the emitter device), the mechanical locking of the transmission assembly by contact points ensuring only the positioning and the holding in position (with rotation stopped), and a system for detecting the activation of the octave key, associating, for example and illustratively, a magnetic measurement and a discrimination algorithm.

Furthermore, the transmission assembly according to the invention allows for the reception of the waves transmitted (at the receiver device) through the air column of the instrument, the positioning and the holding in position of the transmission assembly in the tubular body of the instrument without modification of the instrument or hindrance in the use of the instrument with fixing structures that adapt to the different instruments, the communication between the transmission devices, the processing of the information using the transformation device, and finally an energy autonomy by virtue of the installation of a battery in the transmission assembly (preferentially in the reception device for bulk reasons).

Figure 8:
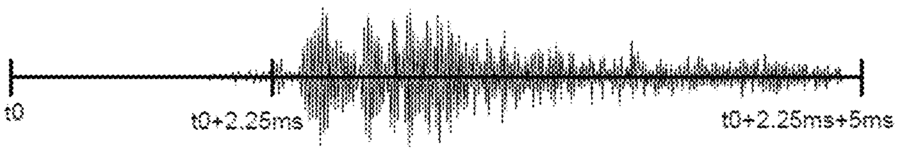
FIG. 8 schematically represents an acoustic signature for a note played with an alto saxophone.

FIG. 8 schematically represents an acoustic signature for a note played with an alto saxophone. This here is an example to represent the order of magnitude of the wave propagation and reception times. The instant to represents the start of the emission. At t0+2.25 ms the start of reception takes place. The time of 2.25 ms corresponds to the propagation time of the signal in the air between the crook and the bell. The end of reception takes place at t0+2.25 ms+5 ms.

In order to have a good responsiveness, an excitation in the ultrasound spectrum is prioritized. That makes it possible to have a quasi-standing regime more rapidly than in the audible spectrum. As an example, the note «La» at 442 Hz has a period of 2.26 ms. A quasi-standing regime can be considered after approximately 10 periods. That gives a delay of 22.6 ms to detect such a note by using the audible spectrum. By using a frequency of 30 kHz, the period is reduced to 0.033 ms. That therefore gives a delay of 0.33 ms for 10 periods. In this case, it is the speed of sound (and therefore the time it takes for the sound to arrive at the receiver) which imposes the minimal detection delay.

Typically, a frequency scan from 20 kHz to 40 KHz for an alto saxophone emitted by the piezoelectric actuator generates an ultrasound which is displaced in the air column. After a time of propagation of the signal in the air between the crook (emission device) and the bell (reception device) of approximately 2 ms, the sound is recorded by the reception module (as represented in FIG. 8). The emission signal is modified by the air column and the position of the valves. On reception, this signal has a unique acoustic signature. This signature can be compared either by an algorithm of SVM, the abbreviation for Support Vector Machine, type (or more broadly a machine learning algorithm) or by a deterministic algorithm with the acoustic signature of the calibration in order to recognize the note played.

In one embodiment, the airborne acoustic wave reception device R further comprises a temperature sensor linked to the transformation device 30. This sensor is preferentially disposed in the hollow body of the second structure. The temperature sensor makes it possible to measure the temperature of the air in the air column.

It has been found that the surrounding temperature can influence the detection of the notes according to the temperature variation ranges. Indeed, the method for detecting and identifying the state of plugging of the holes of the instrument operates optimally for a certain temperature range, for example at an ambient temperature of 20° C., which corresponds to the ambient temperature during calibration. The method for detecting and identifying the state of plugging of the holes of the instrument therefore ensures a perfect rendering of the notes if the use of this method is done at this temperature. If the instrument is used at a different temperature (for example following storage in a car trunk exposed to the sun), the detection of the notes will be affected thereby. The applicant has performed tests by exposing a saxophone to a high temperature then by using, in a room at 20° C., the method for detecting and identifying the state of plugging of the holes. Some notes are not correctly identified, and it takes an hour and a half for a return to normal. That means that a recalibration would be necessary. The presence of the temperature sensor in the transmission assembly of the invention makes it possible to have information on the temperature in the phase of use of the detection method. It has been found that an increase in temperature translates the frequency spectrum. With the temperature sensor present, it is therefore possible to have the frequency spectrum coincide with that at 20° C. (or any other reference temperature corresponding to the temperature of the instrument in the learning phase). The frequency spectrum translation factors can be studied beforehand just once in the learning phase. There is a factor for each temperature for a given instrument. Next, this factor is applied in real-time in the phase of use. Thus, it is no longer necessary to recalibrate the method on each change of temperature.

It should be noted that the aspects presented hereinabove make it possible to render the transmission assembly as robust as possible. However, that necessitates at least one specific calibration per instrument. A modification of the instrument or a slight defect such as a dent therefore requires a new calibration since the transmission of waves via the air column will be impacted thereby. A recalibration procedure can be put in place which takes as reference an audible sound and, in this particular case, a true note which serves as reference. Alternatively, or in addition, it is also possible to proceed with a conventional calibration done by using only the ultrasound spectrum. That makes it possible to recalibrate the associated transfer function in the ultrasound spectrum. For this realignment, a frequency scan which covers the audible spectrum and the ultrasound spectrum must be performed.

The invention relates also to a musical wind instrument 100 with side holes intended to selectively produce acoustic sounds and electric sounds, comprising a transmission assembly 60 as described previously.

The musical wind instrument 100 with side holes can be a saxophone or a clarinet or a flute or an oboe or a bassoon.

The invention claimed is:

1. An airborne acoustic wave transmission assembly configured to be combined with a musical wind instrument with side holes comprising a tubular body defining an air column, the tubular body extending locally substantially along a first axis (X), said transmission assembly being configured to be disposed removably inside the tubular body of the instrument, the transmission assembly comprising:

An emitting device (E) for emitting airborne acoustic waves in the air column comprising:

a first fixing structure for fixing to the tubular body of the instrument;

an actuator configured for transforming an electrical signal into airborne acoustic waves that propagate in the air column;

an intermediate element for fixing the actuator to the first fixing structure configured to separate the actuator from the tubular body;

an airborne acoustic wave reception device (R) comprising:

a second fixing structure for fixing to the tubular body of the instrument;

a microphone linked to the second fixing structure, the microphone being configured for receiving, after the propagation thereof in the air column, the airborne acoustic waves emitted by the actuator, the microphone being positioned off-center with respect to the first axis (X);

a transformation device linked to the second fixing structure and configured for transforming the airborne acoustic waves received by the microphone into an electrical signal characterizing a configuration of plugging of the side holes of the instrument, the tubular body comprising a stop, in which the first fixing structure comprises a guideway, the guideway being configured to guide the emission device (E) along the tubular body to the stop.

2. The transmission assembly as claimed in claim 1, wherein the intermediate element for fixing the actuator to the first fixing structure is an insulating membrane configured to prevent a transfer of acoustic mechanical waves from the actuator to the tubular body, the intermediate element being made of foam, rubber or plastic.

3. The transmission assembly as claimed in claim 1, wherein the airborne acoustic wave reception device (R) comprises a device configured for positioning the second fixing structure with respect to the tubular body.

4. The transmission assembly as claimed in claim 3, wherein the device configured for positioning the second fixing structure comprises at least three spot contacts between the second fixing structure and the tubular body configured to block the airborne acoustic wave reception device (R) in rotation around the first axis (X).

5. The transmission assembly as claimed in claim 1, wherein the actuator is a piezoelectric actuator, a piezoelectric pad, a loudspeaker or an electrodynamic exciter.

6. The transmission assembly as claimed in claim 1, wherein the microphone is a wideband microphone.

7. The transmission assembly as claimed in claim 1, further comprising a device configured for detecting a position of a key of the instrument linked to the transformation device.

8. The transmission assembly of claim 7, wherein the device configured for detecting a position of a key of the instrument comprises at least two magnetometers and one magnetic field emitter.

9. The transmission assembly as claimed in claim 1, wherein the airborne acoustic wave reception device (R) further comprises a loudspeaker linked to the transformation device, said loudspeaker being configured to convert the electrical signal characterizing a configuration of plugging of the side holes of the instrument into a musical audible note.

10. The transmission assembly as claimed in claim 1, wherein the airborne acoustic wave reception device (R) further comprises a temperature sensor linked to the transformation device, and configured to supply the transformation device with temperature information, the transformation device being configured to take account of temperature when transforming the airborne acoustic waves received by the microphone into the electrical signal characterizing a configuration of plugging of the side holes of the instrument.

11. A musical wind instrument with side holes intended to selectively produce acoustic sounds and electric sounds, comprising a transmission assembly as claimed in claim 1.

12. The musical wind instrument with side holes as claimed in claim 11, wherein said instrument is a saxophone or a clarinet or a flute or an oboe or a bassoon.

* * * * *